Patented Aug. 11, 1953

2,648,647

UNITED STATES PATENT OFFICE 2,648,647

POLYMERIZING ACRYLONITRILE IN AQUEOUS MIXED SALTS

George W. Stanton, Walnut Creek, Theodore B. Lefferdink, Concord, and Clyde W. Davis, Antioch, Calif., assignors to The Dow Chemical Company, Midland, Mich., a corporation of Delaware No Drawing. Application May 28, 1951, Serial No. 228,752

6 Claims. (Cl. 260—29.6)

This invention relates to a method of polymerizing acrylonitrile, either alone, to form the homopolymer, or in the presence of a minor amount of another polymerizable vinyl compound to form a copolymer. It relates in particular to a method whereby acrylonitrile may be polymerized to form directly a clear, uniform solution of a polymeric body containing 85 per cent or more of acrylonitrile, which solution is useful for spinning tough fibers of the polymer.

It has been reported by Kropa, in U. S. 2,356,767, that acrylonitrile and its mixtures with other monomers may be polymerized in aqueous solutions of zinc chloride, bromide or iodide, if there is present at least a 65 per cent concentration of the zinc salt in water. It is shown in the same reference that, for thermally induced polymerizations of acrylonitrile, temperatures of the order of 90° to 100° C. are desirable and that the resulting solutions have high viscosities, as they require considerable pressure when being forced through spinnerets. It is also taught that such salts as sodium chloride, aluminum chloride, magnesium chloride and the like will aid coagulation of the polymer when added to the zinc salt solution after polymerization.

It is believed to be uneconomical to carry out the polymerization in such concentrated solutions of zinc salts, and to be undesirable to have to work with polymer solutions of such high viscosity that elevated temperatures and pressures are necessary in order to make fibers or other shaped articles from them.

It is accordingly an object of the present invention to provide a method of polymerizing acrylonitrile and mixtures thereof with other polymerizable vinyl compounds, in aqueous salt solutions, to produce clear solutions of the polymer at moderate temperatures, which solutions have low enough viscosities to be spun at or near room temperature and under low applied pressures. Other and related objects may become apparent from the following description of the invention.

It has now been found that a marked advantage accrues to the use of a mixture of two different types of salts in the aqueous solution in which the acrylonitrile is polymerized. The said aqueous solution contains from about 30 to about 50 per cent of a salt which, only in more concentrated solution and usually at higher temperatures, is a solvent for the polymer, and an additional but lesser amount, from 5 to 25 per cent, such that the aggregate amount of both salts is at least 55 per cent, of a salt which is a non-solvent for the polymer at the temperature employed, even at high concentrations. In the foregoing paragraph, and throughout this specification and the appended claims, the amount of salts in the aqueous solution is reported as per cent by weight of salt based on the weight of the solution, i. e., on the combined weights of salts and water.

The better to define the "solvent" and "non-solvent" salts a table of cations is given below, in the approximate order of their effectiveness in dissolving the polymers here concerned. A companion list of anions, completing the lyotropic series, is also presented.

TABLE

*Lyotropic series for polyacrylonitrile*

| Cations in Increasing Order of Effectiveness | Anions in Decreasing Order of Effectiveness |
|---|---|
| $K^+$ | |
| $Fe^{+++}$ | |
| $Pb^{++}$ | |
| $NH_4^+$ | |
| $Cd^{++}$ | $SCN^-$ |
| $Al^{+++}$ | |
| $Na^+$ | |
| $Ba^{++}$ | $I^-$ |
| $Ca^{++}$ | |
| $Li^+$ | $Br^-$ |
| $Mg^{++}$ | |
| $Ga^{+++}$ | |
| $Sb^{+++}$ | |
| $In^{+++}$ | $Cl^-$ |
| $Tl^{+++}$ | |
| $Sn^{++++}$ | |
| $Zn^{++}$ | |
| $Ag^+$ | |
| $Ni^{++}$ | $NO_3^-$ |
| $Co^{++}$ | |
| $Mn^{++}$ | |
| | $SO_4^-$ |

Thus, of the cations listed, potassium and ferric salts are the least effective solvents, regardless of their associated anions, and, of the anions listed, the sulfates are the least effective solvents, regardless of their associated cations. Each listed cation forms a "solvent salt" with the anions at equal or higher levels in the table, and forms non-solvent salts with anions lower in the table. Thus, no sulfate of a tested metal has been found to dissolve the polymer. No nitrate of a metal, above the group containing silver and zinc has been found effective. No chloride of a metal above the group containing tin is effective, but the chlorides of antimony, zinc, nickel, cobalt and manganese serve as solvent salts. No bromide of a metal above calcium is a solvent for the polymer, but the water-soluble bromides of the metals below calcium are all solvents. The highly soluble iodides of all metals below sodium and the soluble thiocyanates of all the listed metal cations except the potassium, ferric, and plumbous ions, are "solvents." The materials employed in the present invention, either as "solvent" or as "non-solvent" salts, must be readily soluble in water and the solvent and non-solvent salt constituents of the system must be capable of remaining dissolved when both are present in the same aqueous medium. Thus, silver nitrate cannot be used with any halide or thiocyanate, and no sulfate can be used together with a calcium salt, for example. In the foregoing table, the cations in each group, the groups being divided by horizontal lines, are of approximately equal effectiveness, all members of the groups level with or below the thiocyanate anion forming salts (with anions at the same or higher level in the table) that are better solvents for the polymer than are the corresponding salts of cations in any higher group.

When the monomer, or mixture of monomers, is dissolved in such a mixed salt solution and is subjected to polymerization, which may be catalyzed with peroxygen compounds which are not reactive with the salts employed, or with dialiphatic azo compounds, or an azobisacrylonitrile or with actinic radiations, at a temperature which need not exceed 45° to 50° C. and may even be lower than 20° to 30° C., there is formed a clear solution which is free from gels when the ratio of original monomers to salt solution present is kept within practical limits. It should be noted that actinic radiations usually lead to higher molecular weight polymers than do chemical catalysts. For best results, the volume of monomer should be in the range from about 10 to 40 per cent of the volume of mixed salt solution. For practical spinning operations, however, the original monomer-salt ratio should be such as to provide a polymer solution of about 4 to 15 per cent polymer content by weight. Such solutions of the polymeric body are useful for wet-spinning operations at temperatures below 50° C., and have a low enough viscosity so as to require little pressure to force them through spinnerets.

The solubility of monomeric acrylonitrile in aqueous solutions of the mixed salts, defined above, is greater than 10 per cent by volume and generally greater than 4 per cent by weight even at temperatures up to 80° C. While monomer solubility decreases with increased proportions of the diluent salt, as well as with increased temperature of the salt solution, it is desirable to use the above-defined salt mixtures, rather than solutions of solvent salts alone, as mixtures give polymeric bodies which form better spun products such as fibers or films than those made in the single salt brines.

In carrying out the polymerization process of the present invention it is desirable to avoid using a catalyst which is reactive with the salt constituents of the polymerization medium. Thus, the concurrent use of one or more metal bromides is to be avoided when the polymerization catalyst is potassium persulfate, as the persulfates liberate bromine from the bromides and are reduced to sulfates, becoming ineffective as catalysts. The purity of the salt solutions employed has been found to have a marked effect on the amount and quality of polymer obtained. Thus, the molecular weight of the polymer and the polymerization rate may be affected by the presence of trace quantities of compounds of copper, nickel, manganese or iron, when the salt system is a mixture of zinc and calcium or magnesium chlorides, and when the catalyst is a persulfate. The pH of the polymerization medium also exerts an influence on the type of polymer obtained, with higher pH values favoring the formation of high molecular weight polymers. Of the many salts listed in the foregoing table, the ones preferred for use in the invention are stannic chloride, zinc chloride and zinc nitrate as the solvent salts, and the chlorides and nitrates of magnesium, calcium, aluminum and sodium as the non-solvent salts. It is preferred that both salts in each mixed brine have the same anion, though this is not a necessary condition.

The invention may be illustrated by reference to the following examples. The indicated amount of monomeric acrylonitrile was dissolved in an aqueous brine containing the stated concentrations of the designated salts. There was added two per cent of potassium persulfate, based on the weight of monomer, and the solution was heated to the stated temperature for from 2 to 4 hours, by which time polymerization was complete. The solutions were brought to 30° C., and the viscosity was determined.

| Salt Composition | | Wt. percent of acrylonitrile | Polymerization Temperature, °C. | Viscosity, poises |
|---|---|---|---|---|
| $ZnCl_2$ | $CaCl_2$ | | | |
| 60 | -------- | 7.14 | 50 | 4,480 |
| 60 | -------- | 7.0 | 30 | 8,960 |
| 60 | -------- | 7.0 | 50 | 4,000 |
| 35 | 25.5 | 8.65 | 30 | 5,888 |
| 34.6 | 27.2 | 10.6 | 30 | 4,480 |
| 35 | 25 | 7.38 | 30 | [1] 276 |
| $ZnCl_2$ | $MgCl_2$ | | | |
| 45 | 15 | 7.15 | 30 | 1,152 |
| 45 | 15 | 7.15 | 50 | 890 |

[1] This run was made with salts containing about 2 parts per million of copper.

Under substantially identical conditions, tougher and more useful fibers could be spun from the mixed salt solutions than from the solutions in a single salt.

In like manner, and with similar advantage, numerous other pairs of salts may be used instead of the zinc chloride-calcium chloride and zinc chloride-magnesium chloride pairs employed in the illustrative example. In each case the two salts employed must be mutually soluble in water. One salt must have its anion at least as high in the lyotropic series as its cation, and the other must have its anion lower in that series than its cation. The polymeric body resulting from the present process remains in solution in the described mixed salts at temperatures which need not exceed 45° C.

The examples have shown the application of the invention to the preparation of the homopolymer of acrylonitrile, but the invention is not so limited. It is applicable as well to the production of copolymers of acrylonitrile with other monoethylenically unsaturated polymerizable compounds, in which acrylonitrile predominates, and is of special advantage in the preparation of those copolymers containing over 85 per cent acrylonitrile, as these are the ones which are of greatest utility in making textile fibers, yet are the most difficult to dissolve in common solvents. Among the comonomers which may be employed are allyl alcohol, vinyl acetate, dimethylaminoethyl acrylate, allyl amine, allyl trimethylammonium chloride, acrylamide, methacrylamide, viny pyridine, methyl acrylate, and the like, which produce polymers soluble in the aqueous salt system.

We claim:
1. The method which comprises polymerizing a material selected from the group consisting of monomeric acrylonitrile and mixtures thereof, wherein acrylonitrile predominates, with another polymerizable monoethylenically unsaturated compound, in an aqueous solution of at least 30 per cent based on the total weights of salts and water in said solution, but less than a concentration which will dissolve the intended polymer, of a salt whose anion is at least as high in the appended lyotropic series of solvents for the polymer as its cation, and an additional but lesser amount, from 5 to 25 per cent, of another salt, mutually soluble in the water with the first, whose anion is lower in the said lyotropic series than its cation, the aggregate concentration of both salts being at least 55 per cent by weight in said solution, and the initial concentration of monomer in the salt solution being at least 10 per cent by volume, thereby to produce a clear, spinnable solution of a polymer rich in acrylonitrile; said lyotropic series of solvents for the polymer being:

| Cations in Increasing Order of Effectiveness | Anions in Decreasing Order of Effectiveness |
|---|---|
| K+ | |
| Fe+++ | |
| Pb++ | |
| NH4+ | |
| Cd++ | SCN- |
| Al+++ | |
| Na+ | I- |
| Ba++ | |
| Ca++ | |
| Li+ | Br- |
| Mg++ | |
| Ga+++ | |
| Sb+++ | |
| In+++ | Cl- |
| Tl+++ | |
| Sn++++ | |
| Zn++ | |
| Ag+ | |
| Ni++ | NO3- |
| Co++ | |
| Mn++ | |
| | SO4- |

2. The method which comprises polymerizing a material selected from the group consisting of monomeric acrylonitrile and mixtures thereof, wherein acrylonitrile predominates, with another polymerizable monoethylenically unsaturated compound, at a temperature from 20° to 50° C. in an aqueous solution of from about 30 to about 50 per cent based on the total weights of salts and water in said solution, of a salt which only at higher concentration in water is a solvent for polyacrylonitrile and whose anion is at least as high as its cation in the lyotropic series of solvents for the polymer set forth in claim 1, and an additional but lesser amount, from 5 to 25 per cent, of a salt whose anion is lower in said lyotropic series than its cation and which is mutually soluble in water with the first salt and is a non-solvent for polyacrylonitrile at similar temperatures, even at high concentrations, the aggregate concentration of the two types of salts being from 55 to 65 per cent by weight in said solution, and the initial concentration of monomer in the salt solution being at least 10 per cent by volume, thereby to produce a clear, spinnable solution of a polymer rich in acrylonitrile.

3. The method which comprises polymerizing a material selected from the group consisting of monomeric acrylonitrile and mixtures thereof, wherein acrylonitrile predominates, with another polymerizable monoethylenically unsaturated compound, in an aqueous solution of from 30 to about 50 per cent based on the total weights of salts and water in said solution, of zinc chloride and an additional but lesser amount, from 5 to 25 per cent, of calcium chloride, the aggregate concentration of the two salts being from 55 to 65 per cent by weight in said solution, and the initial concentration of monomer in the salt solution being at least 100 per cent by volume, thereby to produce a clear, spinnable solution of a polymer rich in acrylonitrile.

4. The method as claimed in claim 1, wherein the monomer employed contains at least 85 per cent acrylonitrile.

5. The method as claimed in claim 1, wherein the only monomer employed is that of acrylonitrile.

6. The method as claimed in claim 3, wherein calcium chloride is replaced by magnesium chloride.

GEORGE W. STANTON.
THEODORE B. LEFFERDINK.
CLYDE W. DAVIS.

References Cited in the file of this patent

UNITED STATES PATENTS

| Number | Name | Date |
|---|---|---|
| 2,140,921 | Rein | Dec. 20, 1938 |
| 2,425,192 | Kropa | Aug. 5, 1942 |
| 2,479,367 | Joyce et al. | Aug. 16, 1949 |